US009774821B2

(12) United States Patent
Choi

(10) Patent No.: US 9,774,821 B2
(45) Date of Patent: Sep. 26, 2017

(54) DISPLAY APPARATUS AND CONTROL METHOD THEREOF

(71) Applicant: SAMSUNG ELECTRONICS CO., LTD., Suwon-si (KR)

(72) Inventor: Hak-hun Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/823,126

(22) Filed: Aug. 11, 2015

(65) Prior Publication Data
US 2016/0100127 A1    Apr. 7, 2016

(30) Foreign Application Priority Data

Oct. 1, 2014    (KR) .......................... 10-2014-0132638

(51) Int. Cl.
H04N 7/01 (2006.01)
H04N 21/426 (2011.01)
H04N 21/485 (2011.01)
H04N 5/445 (2011.01)

(52) U.S. Cl.
CPC ........... H04N 7/013 (2013.01); H04N 7/0137 (2013.01); H04N 21/42653 (2013.01); H04N 21/4854 (2013.01); H04N 5/44504 (2013.01)

(58) Field of Classification Search
USPC .......................... 348/441, 443, 445, 447, 448
See application file for complete search history.

(56) References Cited

U.S. PATENT DOCUMENTS

| 6,741,266 B1 | 5/2004 | Kamiwada et al. |
| 7,023,486 B2* | 4/2006 | Takayama ............ G11B 27/005 348/441 |
| 8,175,121 B2 | 5/2012 | Fukuda et al. |
| 8,319,887 B2 | 11/2012 | Hamada et al. |
| 8,885,099 B2* | 11/2014 | Balram ................ G06F 3/14 348/441 |
| 9,094,709 B2* | 7/2015 | Jeong ............... H04N 21/4312 |
| 2003/0031461 A1* | 2/2003 | Takayama ........... G11B 27/005 386/241 |
| 2008/0071807 A1* | 3/2008 | Pappu ................. G06Q 10/06 |
| 2008/0129862 A1 | 6/2008 | Hamada et al. |
| 2008/0181312 A1 | 7/2008 | Kimura |
| 2008/0211968 A1 | 9/2008 | Murakami et al. |

(Continued)

FOREIGN PATENT DOCUMENTS

| CN | 1905663 A | 1/2007 |
| CN | 101167353 A | 4/2008 |

(Continued)

OTHER PUBLICATIONS

Communication dated Oct. 7, 2015 issued by the Korean Intellectual Property Office in counterpart Korean Patent Application No. 10-2014-0132638.

(Continued)

Primary Examiner — Paulos M Natnael
(74) Attorney, Agent, or Firm — Sughrue Mion, PLLC

(57) ABSTRACT

A display apparatus is disclosed. The display apparatus includes an image processor configured to convert a frame rate of an image signal to a frame rate converted image signal, a display configured to display an image based on the frame rate converted image signal, and a controller configured to control the image processor to add an object to at least one of the image signal and the frame rate converted image signal depending on a characteristic of the object.

18 Claims, 9 Drawing Sheets

(56) References Cited

U.S. PATENT DOCUMENTS

| | | | |
|---|---|---|---|
| 2009/0059074 A1 | 3/2009 | Suematsu et al. | |
| 2009/0073311 A1 | 3/2009 | Hamada et al. | |
| 2010/0091186 A1 | 4/2010 | Takata | |
| 2010/0178038 A1* | 7/2010 | Ju | H04N 5/44504 386/241 |
| 2013/0169672 A1* | 7/2013 | Kim | H04N 13/0438 345/619 |
| 2013/0169766 A1* | 7/2013 | Shin | H04N 13/0438 348/55 |
| 2013/0169772 A1* | 7/2013 | Kim | H04N 13/0438 348/56 |
| 2013/0276031 A1* | 10/2013 | Oh | H04N 21/4622 725/42 |
| 2014/0157200 A1* | 6/2014 | Jeon | G06F 3/0482 715/834 |
| 2014/0253816 A1* | 9/2014 | Shin | H04N 5/4403 348/734 |
| 2014/0320507 A1* | 10/2014 | Myung | G06T 13/80 345/474 |

FOREIGN PATENT DOCUMENTS

| | | |
|---|---|---|
| CN | 101197998 A | 6/2008 |
| CN | 101222589 A | 7/2008 |
| CN | 101902609 A | 12/2010 |
| JP | 2001-84073 A | 3/2001 |
| JP | 2007-10498 A | 1/2007 |
| JP | 2008-160591 A | 7/2008 |
| JP | 2009-253567 A | 10/2009 |
| KR | 10-2009-0081824 A | 7/2009 |

OTHER PUBLICATIONS

Communication dated Dec. 8, 2015 issued by the European Patent Office in counterpart European Patent Application No. 15183366.2.

Search Report issued Jan. 19, 2016, issued by the International Searching Authority in counterpart International Patent Application No. PCT/KR2015/009997 (PCT/ISA/210).

Written Opinion issued Jan. 19, 2016, issued by the International Searching Authority in counterpart International Patent Application No. PCT/KR2015/009997 (PCT/ISA/237).

Communication dated Nov. 3, 2016 issued by the State Intellectual Property Office of People's Republic of China in counterpart Chinese Patent Application No. 201610202492.1.

Communication issued Jun. 5, 2017 by the State Intellectual Property Office of P.R. China in counterpart Chinese Patent Application No. 201610202492.1.

* cited by examiner

DISPLAY APPARATUS AND CONTROL METHOD THEREOF

CROSS-REFERENCE TO RELATED APPLICATION

This application claims priority from Korean Patent Application No. 10-2014-0132638, filed on Oct. 1, 2014, in the Korean Intellectual Property Office, the disclosure of which is incorporated herein by reference in its entirety.

BACKGROUND

1. Field

Apparatuses and methods consistent with exemplary embodiments relate to a display apparatus and a control method thereof, and more particularly, to a display apparatus which converts a frame rate and a control method thereof.

2. Description of Related Art

With the development of electronic technology, various electronic products have been developed and become increasingly popular. In particular, various display apparatuses, such as a television (TV), a portable phone, a personal computer (PC), a laptop PC, or a personal digital assistant (PDA) have been increasingly used in homes.

As display apparatuses have become more widespread, users desire additional versatile functions. As manufacturers strive to meet the user demand, products having new functions are emerging one after another.

Thus, functions performed in the display apparatuses have become increasingly diversified. In particular, in recent years, many display apparatuses while reproducing moving images perform frame rate conversion, process motion to be smoother, and display a smoother image with a converted frame rate.

In particular, screen size and resolution of the display apparatuses have increased, and thus a frame rate conversion function has become increasingly important. Further, an amount of processed information and interfacing between chips has increased. As additional functions are added to the display apparatuses, additional information for a graphic user interface (GUI) is needed to be displayed.

Thus, as the frame rate conversion is performed on the GUI displayed on a screen together with an image, a boundary of the GUI may be broken or redundantly displayed in response to a size of the GUI being relatively small and a motion amount of the GUI being relatively large. On the other hand, if the frame rate conversion is performed only on the image on the screen, and the GUI is processed separately, an amount of information displayed on the GUI is increased, and a required processing amount is increased.

SUMMARY

One or more exemplary embodiments may overcome the above disadvantages and other disadvantages not described above. However, it is understood that one or more exemplary embodiment may not overcome the disadvantages described above, and may not overcome any of the problems described above.

Exemplary embodiments relate to a display apparatus which determines an objects of which a frame rate is to be converted based on a characteristic of the object displayed together with an image and a method thereof.

According to an aspect of an exemplary embodiment a display apparatus includes: an image processor configured to convert a frame rate of an image signal to a frame rate converted image signal; a display configured to display an image based on the frame rate converted image signal; and a controller configured to control the image processor to add an object to at least one of the image signal and the frame rate converted image signal depending on a characteristic of the object.

The characteristic of the object may include at least one of a data requirement, a size, and a movement amount.

The controller may be configured to add the object to the image signal in response to the data requirement being equal to or greater than a preset requirement, and to add the object to the frame rate converted image signal in response to the data requirement being less than the preset requirement.

The controller may be configured to add the object to the image signal in response to the size being equal to or larger than a preset threshold value and the movement amount being less than a threshold amount, and to add the object to the frame rate converted image signal in response to the size being less than the preset threshold value and the movement amount being equal to or greater than the threshold amount.

The controller may be configured to determine at least one of the image signal and the frame rate converted image signal to add the object based object position information and the size.

The controller may be configured to adjust transparency of the object and add the transparency-adjusted object to the frame rate converted image signal based on object transparency information.

The object may include a first object and a second object and the controller may be configured to determine, based on first object data requirement relative to a preset requirement, whether to add the first object to the image signal or the frame rate converted image signal.

The controller may be configured to determine, based on second object data requirement relative to the preset requirement, whether to add the first object to the image signal or the frame rate converted image signal.

The object may include a first object and a second object and the controller may be configured to determine, based on at least one of a first object size relative to a preset threshold value and a first object movement amount relative to a threshold amount, whether to add the first object to the image signal or the frame rate converted image signal.

The controller may be configured to determine, based on at least one of a second object size relative to the preset threshold value and a second object movement amount relative to the threshold amount, whether to add the second object to the image signal or the frame rate converted image signal.

According to another aspect of an exemplary embodiment a control method of a display apparatus includes: determining to add an object to at least one of an image signal and a frame rate converted image signal based on an object characteristic; adding the object to at least one of the image signal and the frame rate converted image signal according to a result of the determining; performing frame rate conversion on the image signal; and displaying an image based on the frame rate converted image signal.

The characteristic of the object may include at least one of a data requirement, a size, and a movement amount.

The performing of the frame rate conversion on the image may include adding the object to the image signal in response to the data requirement being equal to or greater than a requirement capacity, and adding the object to the frame rate converted image signal in response to the data requirement being less than the requirement capacity.

The performing of the frame rate conversion on the image may include adding the object to the image signal in response to the size being equal to or larger than a preset threshold value and the movement amount being less than a threshold amount, and adding the object to the frame rate converted image signal in response to the size being less than the preset threshold value and the movement amount of the object being equal to or greater than the threshold amount.

The displaying of the image of which the frame rate is converted may include determining, based on object position information and object size, which of the image signal and the frame rate converted image signal to add the object to.

The displaying of the image may include adjusting a transparency of the object based on object transparency information, and adding the transparency-adjusted object to the frame rate converted image signal.

The object may include a first object and a second object, and the determining may include adding the first object to the image signal or the frame rate converted image signal based on first object data requirement and a preset requirement.

The determining may include adding the second object to the image signal or the frame rate converted image signal based on second object data requirement and the preset requirement.

The object may include a first object and a second object, and the determining may include adding the first object to the image signal or the frame rate converted image signal based on a first object size relative to a preset threshold value and a first object movement amount relative to a threshold amount.

The determining may include adding the second object to the image signal or the frame rate converted image signal based on a second object size relative to the preset threshold value and a second object movement amount relative to the threshold amount.

According to yet another aspect of an exemplary embodiment an imaging device includes: an image processor configured to perform image signal processing on an input image signal, output a frame rate converted image signal and add an object to at least one of the input image signal and the frame rate converted image signal; and a controller configured to: determine at least one of the input image signal and the frame rate converted image signal to add the object to based on a system resource cost and a threshold system resource cost; and control the image processor to add the object to at least one of the input image signal and the frame rate converted image signal based on the determining.

The object may include a plurality of objects, and the controller may be configured to determine and control each of the plurality of objects to be added to at least one of the input image signal and the frame rate converted image signal.

The controller may be configured to determine the system resource cost for the object based on at least one of an object size and an object movement amount.

Additional aspects of exemplary embodiments will be set forth in the following detailed description, or may be learned by practicing the exemplary embodiments.

BRIEF DESCRIPTION OF THE DRAWINGS

The above and/or other aspects will be more apparent by the following description of exemplary embodiments, with reference to the accompanying drawings, in which.

DETAILED DESCRIPTION

Figure 1:
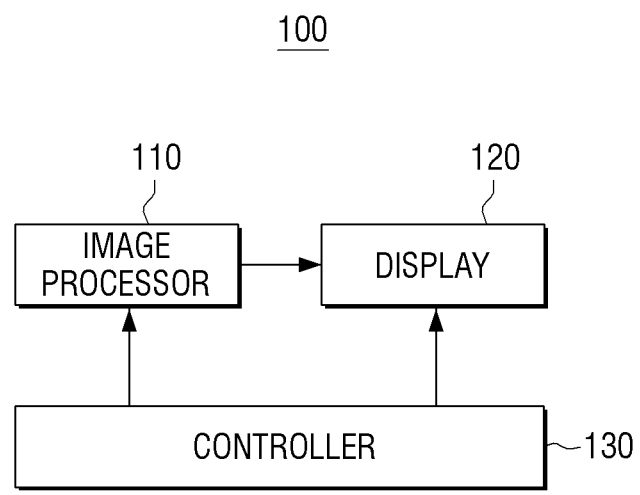
FIG. 1 is a block diagram illustrating a configuration of a display apparatus according to an exemplary embodiment.

Hereinafter, exemplary embodiments will be described with reference to the accompanying drawings.

In the following description, the same reference numerals are used for like or similar elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related may not be described in detail, as they would obscure the exemplary embodiments with unnecessary detail. Expressions such as "at least one of," when preceding a list of elements, modify the entire list of elements and do not modify the individual elements of the list.

FIG. 1 is a block diagram illustrating a configuration of a display apparatus according to an exemplary embodiment.

Referring to FIG. 1, a display apparatus 100 includes an image processor 110, a display 120, and a controller 130. The display apparatus 100 may be implemented in various types of electronic apparatuses, such as a television (TV), an interactive whiteboard, an electronic table, a large format display (LFD), a smart phone, a tablet personal computer (PC), a desktop PC, or a laptop PC.

The image processor 110 may perform signal processing on an image signal. Specifically, the image processor 110 may perform image signal processing, such as image decoding or image scaling, on the image signal. Further, the image processor 110 may perform frame rate conversion on the image signal. The image processor 110 will be described in detail with reference to FIG. 2.

The display 120 may display the image signal with a converted frame rate. Specifically, the display 120 may display moving image content. The moving image content may include all moving images which made of a plurality of images, such as a movie, a drama, a recorded image, or a slow video, and are displayed at a certain frame rate.

Further, the display 120 may display an object, such as a still image, a photo, or text.

The display 120 may be implemented with a liquid crystal display (LCD), an organic light emitting display (OLED), a plasma display panel (PDP), or the like.

The controller 130 may control the image processor 110 to add an object to an image and perform frame rate conversion on the object-added image, or to perform frame rate conversion on the image excluding the object, based on a characteristic of the object displayed together with the image.

For example, the controller 130 may determine whether to add the object, such as captions, to image content. The controller 130 may perform frame rate conversion on the object-added image content based on the characteristic of the object, such as the captions displayed together with the image content in response to displaying image content corresponding to a received broadcast signal.

That is, the controller 130 may control the image processor 110 to add the object, such as the captions, to the image content and simultaneously perform frame rate conversion on the captions and image content or to perform frame rate conversion only on the image content without the captions, based on the characteristic of the object, such as the captions, displayed with the image content.

According to an exemplary embodiment, the controller 130 and the image processor 110 may be implemented by one processor. Alternatively, the controller 130 and the image processor 130 may be implemented by a plurality of processors.

Figure 2:
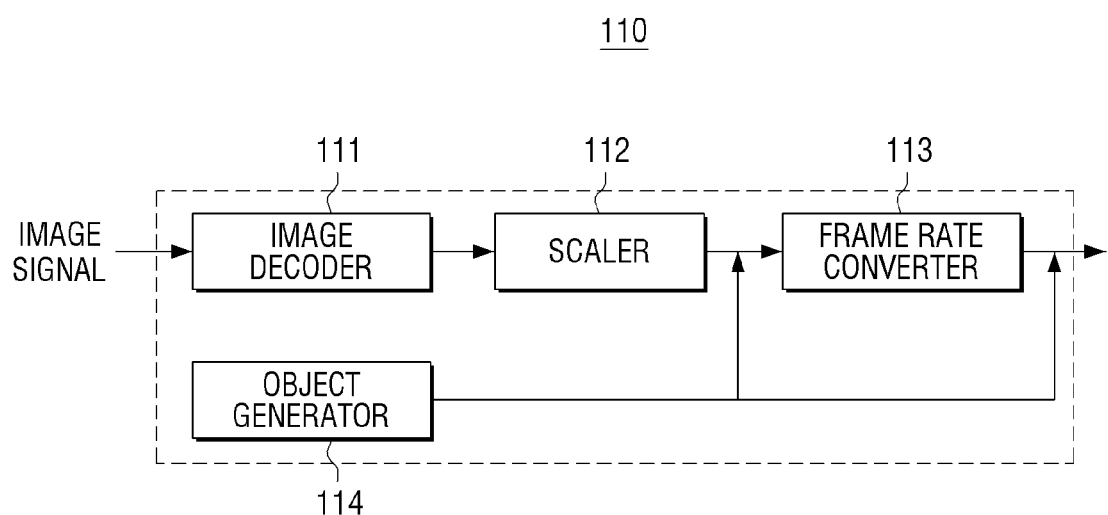
FIG. 2 is a detailed block diagram illustrating an image processor according to an exemplary embodiment.

FIG. 2 is a detailed block diagram illustrating an image processor according to an exemplary embodiment.

Referring to FIG. 2, the image processor 110 includes an image decoder 111, a scaler 112, a frame rate converter 113, and an object generator 114. The decoder 111 may perform decoding on an input image signal and the decompressed image signal may be output from the image decoder 111.

The scaler 112 may scale a size of an image corresponding to the decoded image signal output from the image decoder 111 to a size suitable for the display 120 provided in the display apparatus 100.

The frame rate converter 113 may perform frame rate conversion on the image scaled in the scaler 112. For example, in response to a frame rate of the image transmitted from the scaler 112 being 60 Hz, the frame rate converter 113 may covert the frame rate of the image to 120 Hz. The 120 Hz frame rate provides a smoother motion and is more natural to the user.

In order to increase the frame rate, the frame rate converter 113 has to generate a new frame. The newly generated frame may be referred to as an interpolation frame. For example, if the frame rate is increased from 60 Hz to 120 Hz through the frame rate converter 113, the frame rate converter 113 has to add one frame for every frame. Therefore, the frame rate converter 113 may convert the input image, in which the number of frames is 60 per second, to the image in which the number of frames is 120 per second, and output the converted frame rate image.

A motion estimation/motion compensation (ME/MC) technique may be applied to generate the newly added interpolation frames. The frame rate converter 113 may estimate an intermediate frame based on motions between a previous frame and a next frame, generate a compensated frame, and interpolate the generated frame through the ME/MC technique. Therefore, the image having the frame rate converted through the ME/MC technique may be provide a smoother image.

The object generator 114 may generate an object to be displayed with the image. The object generator 114 may add the object to the scaled image output from the scaler 112 and provide the object-added image to the frame rate converter 113. Alternatively, the object generator 114 may add the object to the frame rate converted image output from the frame rate converter 113.

Among the characteristics of the object, the data required to display the object, which is generated from the object generator 114 and displayed together with the image, is considered. In response to the scaled image being provided to the frame rate converter 113, and the object being transmitted separately from the image and added to the frame rate converted image which is output from the frame rate converter 113, the amount of transmitted data is increased, and thus an amount of consumption of a resource and an amount of an interface for data transmission are increased.

That is, the resource consumption and data transmission increase when the object is transmitted separately from the image. This is due to the large data requirements of the object being displayed together with the image. To reduce the amount of resource consumption and interface for data transmission, the object generator 114 may add the object to the scaled image output from the scaler 112, and provide the object-added image to the frame rate converter 113.

In response to the data requirement of the object, among the characteristics of the object displayed together with the image being small, it is not necessary to add the object to the scaled image and provide the object-added image to the frame rate converter 113. Therefore, the object generator 114 may add the object to the frame rate converted image and is output from the frame rate converter 113.

The characteristics of the object may include at least one of a data requirement of the object, a size of the object, and a movement amount of the object.

The data requirement of the object means data capacity used, or a size of data required, to display the object on the image. The size of the object means a size of the object displayed in the image, and the movement amount of the object means a movement amount of the object in response to the object being moved in the image.

In particular, the controller 130 may add the object to the image and perform frame rate conversion on the object-added image in response to the data requirement of the object being equal to or greater than a preset requirement, and the controller 130 may perform frame rate conversion on the image not including the object in response to the data requirement of the object being less than the preset requirement. The frame rate conversion process will be described in detail with reference to FIG. 3.

Figure 3:
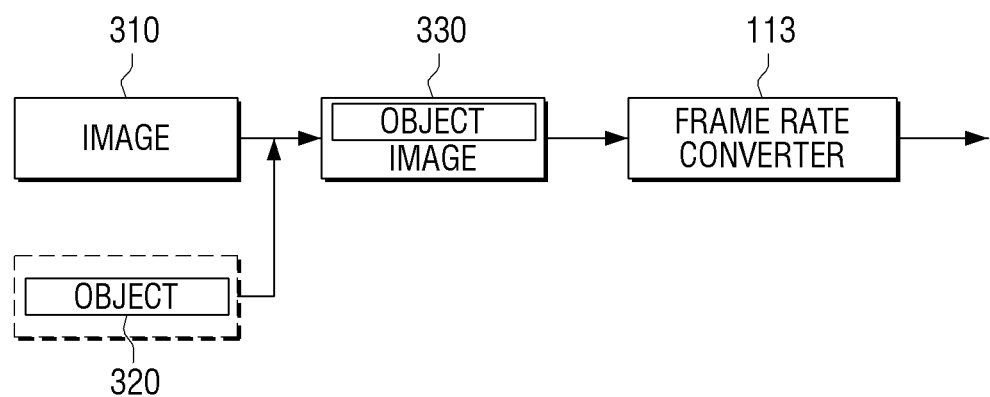
FIG. 3 is a view illustrating a frame rate conversion process according to an exemplary embodiment.

FIG. 3 is a view illustrating a frame rate conversion process according to an exemplary embodiment.

Referring to FIG. 3, the controller 130 may control the image processor 110 to perform image processing on an image 310 and an object 320 displayed together with the image 310. In response to data requirement of the object 320 being equal to or greater than a preset requirement, the controller 130 may add the object 320 to the image 310, and provide an image 330 including the object 320 to the frame rate converter 113 before the frame rate conversion on the image 310 is performed.

The frame rate converter 113 performs frame rate conversion based on the image 330 including the object 320. In response to the data requirement of the object 320 being equal to or greater than the preset requirement, the object 320 is added to the image 310 and the frame rate conversion is performed on the image 330 including the object 320. Therefore, the problem that an amount of resource consumption, an amount of power consumption, and interface capacity used to transmit and process the object 320 is increased due to the large data requirement of the object in response to the frame rate conversion of the image 310 being performed and the object 320 being separately added to the image 310 of which the frame rate is converted, may be solved.

For example, in response to the object 320 being a graphic, such as a user interface screen displayed on an entire screen, a user interface screen including various menus, thumbnail images, items, or the like for an user operation, and the data required to display the user interface screen is mostly large.

Therefore, in response to the user interface screen being displayed while the image 310 corresponding to moving image content is reproduced, the controller 130 may add the user interface screen to the image 310 corresponding to the moving image content, allow the image including the user interface screen, like the image 330 of FIG. 3 including the object 320, to be provided to the frame rate converter 113, and frame-rate convert the image including the user interface screen.

The controller 130 may perform frame rate conversion on the image not including the object if the data requirement of the object is less than the preset requirement. The frame rate conversion process will be described in detail with reference to FIG. 4.

Figure 4:
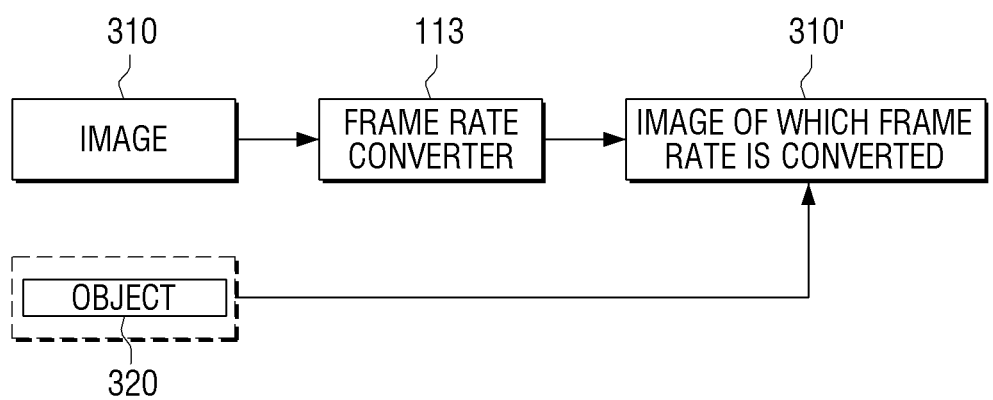
FIG. 4 is a view illustrating another frame rate conversion process according to another exemplary embodiment.

FIG. 4 is a view illustrating a frame rate conversion process according to another exemplary embodiment.

Referring to FIG. 4, the controller 130 may control the image processor 110 to perform image processing on an image 310 and an object 320 displayed together with the image 310. In response to the data requirement of the object 320 being less than the preset requirement, the frame rate converter 113 may perform frame rate conversion on the image 310 and output an image 310' of which the frame rate is converted, and then the controller 130 may add the object 320 to the image 310'.

The frame rate converter 113 performs frame rate conversion only on the image 310, and not the object 320. In response to the data requirement of the object 320 being less than the preset requirement, the object has a relatively small size.

In response to the size of the object being small, a boundary of the object may be obscure and image quality may be degraded in response to the frame rate conversion being performed on the object. Further, even in response to the frame rate conversion on the image 310 being performed and the object 320 being separately added to the image 310' of which the frame rate is converted, because the data requirement of the object 320 is relatively small, an amount of resource consumption, an amount of power consumption, and interface capacity used to transmit and process the object 320 are also relatively small.

Therefore, the frame rate converter 113 performs frame rate conversion on the image 310 and outputs the image 310' of which the frame rate is converted, and then the controller 130 adds the object 320 to the image 310' of which the frame is converted. Thus, both the obscurity of the boundary of the object 320 having the small data requirement, and degradation of the image quality may be prevented.

For example, in response to the object 320 being a GUI, such as a small cursor, the size of the cursor is small, and data required to display the cursor is also relatively small.

In response to the cursor being displayed while the image 310 corresponds to moving image content, the controller 130 may provide the image 310 corresponding to the moving image content to the frame rate converter 113, so that the frame rate conversion is performed on the image 310, and the controller 130 may add the cursor to the image 310 of the moving image content of which the frame rate thereof is converted, and display the cursor-added image.

The image 310 corresponding to the moving image content is transmitted through a main interface according to the low voltage differential signals (LVDS) standard, and the object 320 is transmitted through a sub interface. The LVDS standard is a general interface standard for high-speed data transmission.

The controller 130 may set a data requirement of the sub interface as the preset requirement, compare the data requirement of the object 320 with the data requirement of the sub interface, add the object 320 to the image 310 and perform frame rate conversion on the image 310 including the object 320 in response to the data requirement of the object 320 being greater than the data requirement of the sub interface. The controller 130 may further perform frame rate conversion on the image 310 not including the object 320, and add the object to the image 310 of which the frame rate is converted in response to the data requirement of the object 320 being smaller than the data requirement of the sub interface.

The controller 130 may add the object to the image and perform frame rate conversion on the object-added image in response to a size of the object being equal to or larger than a preset threshold value and a movement amount of the object being less than a threshold amount. The controller 130 may perform frame rate conversion on the image not including the object in response to the size of the object being less than the preset threshold value and the movement amount of the object being equal to or larger than the threshold amount.

For example, if the object 320 is large and displayed on the whole screen, and the movement amount of the object is minimal, the controller 130 may add the object 320 to the image 310 and perform frame rate conversion on the image 330 including the object 320 based on the characteristic that the object 320 has a large size and the movement amount in the object 320 is minimal, as shown in FIG. 3.

As illustrated in FIG. 3, because the data required to display the object 320 increases as the size of the object 320 increases, the amount of resource consumption, the amount of power consumption, and the usage amount of interface capacity used to transmit and process data for display of the object 320 are increased in response to the frame rate conversion on the image 310 being performed, and then the object 320 being added to the image of which the frame rate is converted. Therefore, so as to reduce the amount of resource consumption, the amount of power consumption, and the usage amount of interface capacity used to transmit and process data for display of the object 320, the controller 130 adds the object 320 to the image 310 and then performs frame rate conversion on the image 310 including the object 320.

For example, in response to the object 320 being a cursor moving on the displayed image 310, the cursor has a relatively small size and has a large movement amount. Therefore, the object 320, such as the cursor, has a small size. Accordingly, even in response to the object 320 being separately added to the image 310 after the frame rate conversion on the image 310 is performed, because the data requirement of the object 320 is small, the amount of resource consumption, the amount of power consumption, and the interface capacity used to transmit and process the object 320 are small. Further, because the cursor has a large movement amount, in response to the frame rate conversion being performed on the object 320, such as the cursor, the boundary of the object 320 may be obscure and thus the image quality may be degraded. Therefore, it is preferable that the frame rate conversion only be performed on the image 310 and thereafter adding the object 320 to the image 310 of which the frame rate is converted.

Thus, if the object 320 is the cursor moving on the displayed image 310, the frame rate converter 113 may perform frame rate conversion on the image 310 and output the image 310' of which the frame rate is converted, and then the controller 130 may add the object 320 to the image 310', based on the object 320 having a small size and a large movement amount, as illustrated in FIG. 4.

Specifically, the controller 130 may add the object 320 to the image 310' and display the image 310' including the object 320 in response to performing the frame rate conversion on the image 310 not including the object 320 and then outputting the image 310' from the image processor 110.

Figure 5:
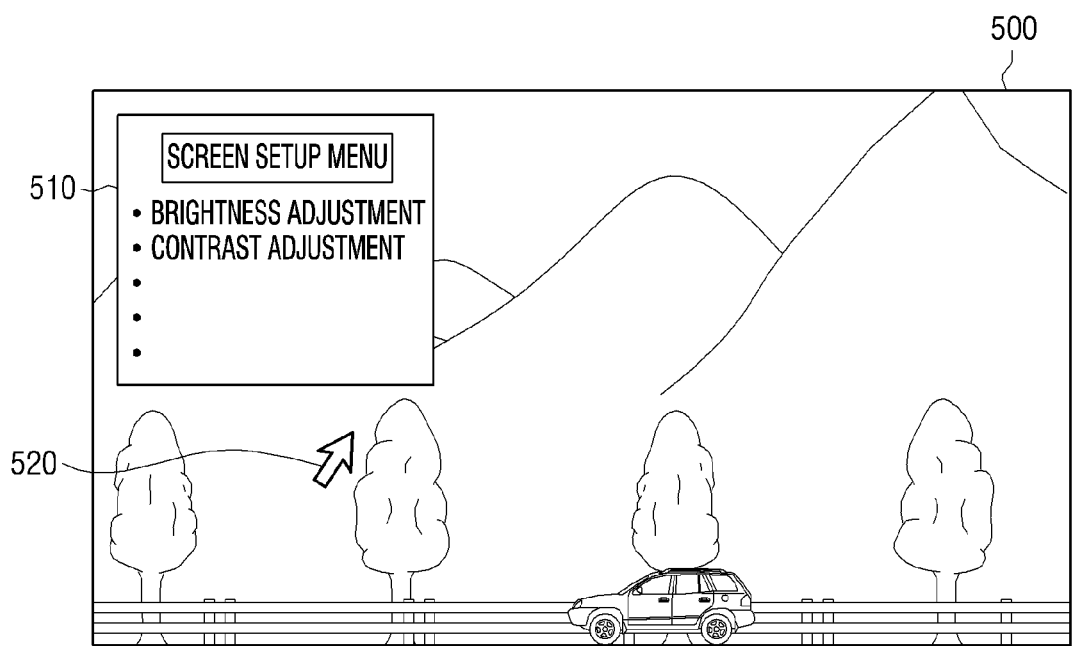
FIG. 5 is a view illustrating an object added to an image according to an exemplary embodiment.

FIG. 5 is a view illustrating an object added to an image according to an exemplary embodiment.

Referring to FIG. 5, a screen setup menu 510 and a cursor 520 are simultaneously displayed on a currently displayed image 500.

The screen setup menu 510 has a large size and no motion. Thus, the controller 130 may add the screen setup menu 510 to the image 500 and perform frame rate conversion on the image 500 including the screen setup menu 510, as shown in FIG. 3. The cursor 520 has a small size and a large movement amount. Thus, the controller 130 may perform frame rate conversion only on the image 500 not including the cursor 520, and separately add the cursor 520 to the image 500 of which the frame rate is converted, as illustrated in FIG. 4.

The controller 130 may add the object to the image of which the frame rate is converted based on information for a position and a size of the object in the image.

The controller 130 may adjust transparency of the object and add the transparency-adjusted object to the image of which the frame rate is converted based on information for the transparency of the object.

The information for the position and size of the object may be transmitted through a sub interface. The sub interface will be described in detail with reference to FIG. 6.

Figure 6:
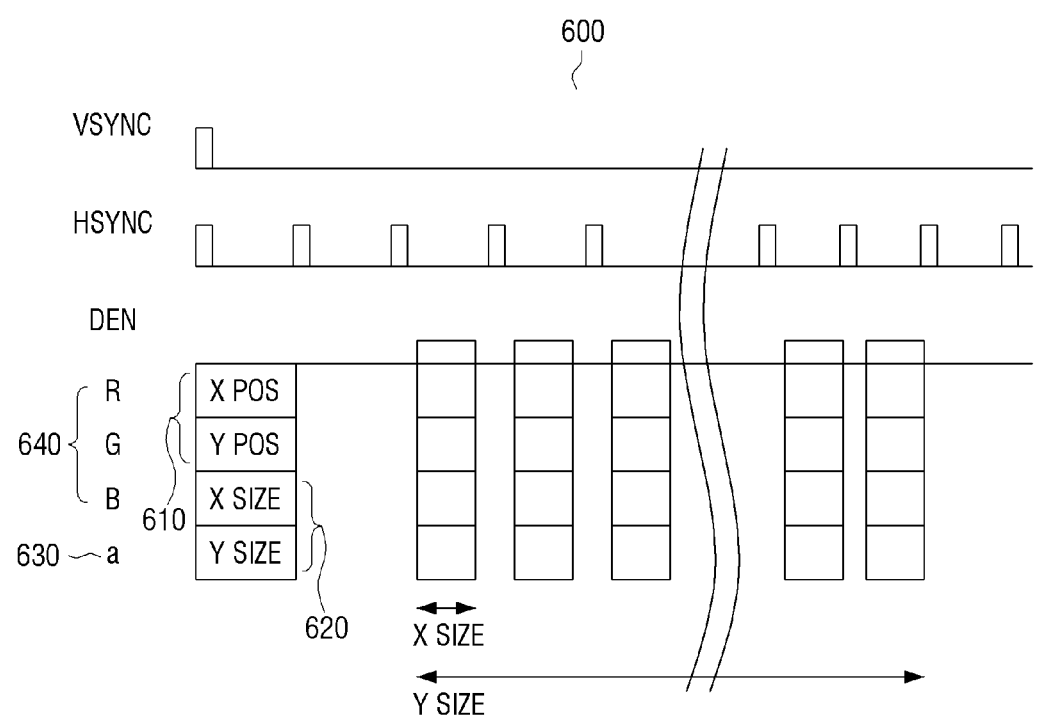
FIG. 6 is a view illustrating a sub interface according to an exemplary embodiment.

FIG. 6 is a view illustrating a sub interface according to an exemplary embodiment.

Referring to FIG. 6, a sub interface 600 may include a vertical synchronous signal VSYNC and a horizontal synchronous signal HSYNC. Further, the sub interface 600 may include position information 610 representing a position of the object 320, including position information X POS on an X-axis and position information Y POS on a Y-axis, size information 620 representing a size of the object 320, which includes size information X SIZE in an X-axis direction and size information Y SIZE in a Y-axis direction, information 630 representing transparency a, and information 640 representing colors R, G, and B.

The controller 130 may add the object 320 to the image 310 of which the frame rate is converted based on the position information 610 and the size information 620.

The controller 130 may adjust the transparency of the object 320 and add the transparency-adjusted object 320 to the image 310 of which the frame rate is converted based on the information 630.

Figure 7:
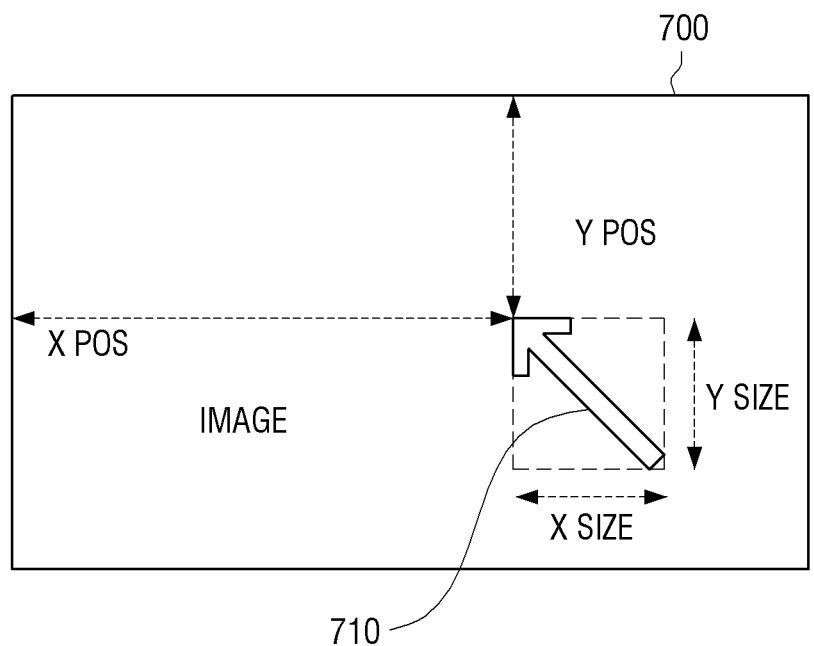
FIG. 7 is a view illustrating a cursor added to an image according to an exemplary embodiment.

FIG. 7 is a view illustrating a cursor added to an image according to an exemplary embodiment.

Referring to FIG. 7, the controller 130 may add a cursor 710 to an image 700 based on position information X POS and position information Y POS, and the controller may adjust transparency of the cursor 710 based on transparency information a.

One or more objects 320 may be displayed together with the image 310. Even in response to a plurality of objects 320 being provided, the controller 130 may determine, for each of the objects 320, whether or not to perform frame rate conversion on the objects 320 together with the image, based on the characteristics of each individual object of the plurality of objects 320.

Specifically, the objects may include a first object and a second object. In response to data requirement of the first object being equal to or greater than a preset requirement, and a data requirement of the second object being less than the preset requirement, the controller 130 may control the first object to be added to the image and frame rate conversion to be performed on the first-object-added image, and in response to the image with the first object added thereto and the frame rate thereof is converted, being output from the image processor 110, the controller 130 may control the second object to be added to the image output from the image processor 110 and the second-object-added image to be displayed.

Further, the object may include a first object and a second object. At this time, in response to a size of the first object being equal to or larger than a preset threshold value, a movement amount of the first object being less than a threshold amount, a size of the second object being less than the preset threshold value and a movement amount of the second object being equal to or greater than the threshold amount, the controller 130 may control the first object to be added to the image and frame rate conversion to be performed on the first-object-added image. In response to the image, which the first object is added thereto and the frame rate thereof is converted, being output from the image processor 110, the controller 130 may control the second object to be added to the image output from the image processor 110 and the second-object-added image to be displayed.

Figure 8:
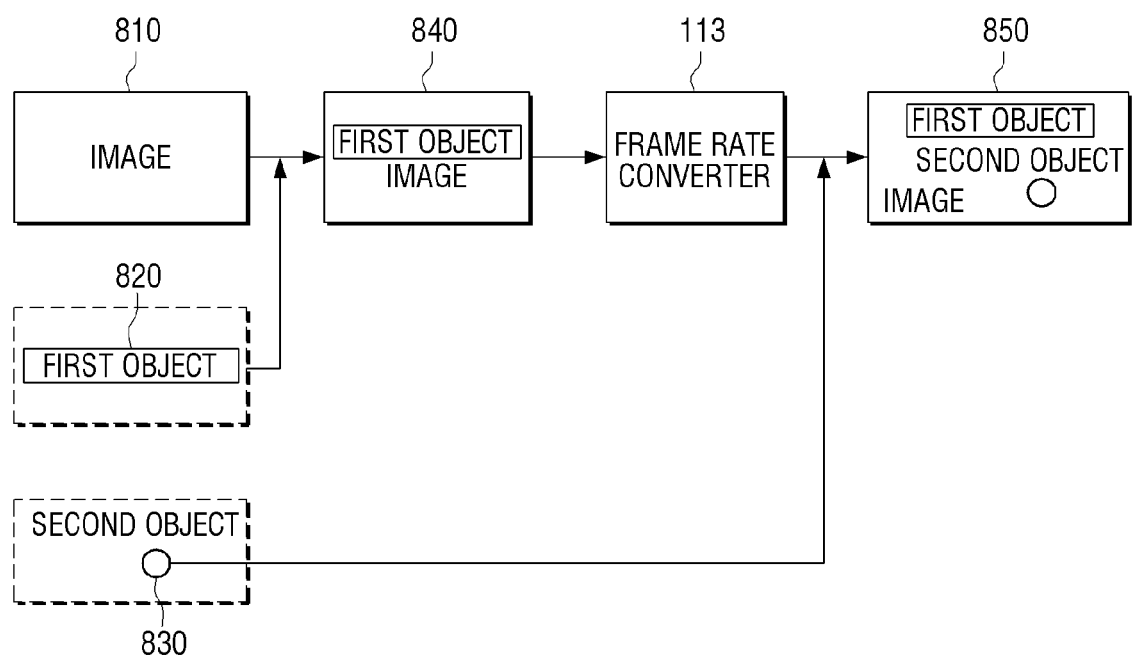
FIG. 8 is a view illustrating a frame rate conversion process in response to a plurality of objects being provided according to an exemplary embodiment.

FIG. 8 illustrates a frame rate conversion process in response to a plurality of objects being provided according to an exemplary embodiment.

For example, a first object 820 and a second object 830 may both be displayed over an image 810. The first object 820 may be a user interface screen displayed on an entire screen and the second object 830 may be a cursor. The user interface screen may be relatively large, have minimal movement, and include various types of menus, thumbnail images, items, or the like for an user operation, and thus require a large amount of data to display the user interface screen. Therefore, the controller 130 may add the first object 820 to the image 810 corresponding to the user interface screen, generate an image 840 including the first object 820, and provide the generated image 840 to the frame rate converter 113.

Because the cursor has a small size and a small movement amount, data required to display the cursor is small. Therefore, the frame rate converter 113 may perform frame rate conversion on the image 840 including the first object 820 and output the image of which the frame rate is converted. The controller may controller 130 add the second object 830 to the image of which the frame rate is converted and is output from the frame rate converter 113, and output an image 850 of which the second object 830 is added to the image output from the frame rate converter 113.

The controller 130 may simultaneously display the image 810, the user interface screen and the cursor. The controller 130 may selectively perform frame rate conversion on the user interface screen and the cursor based on characteristics of the user interface screen and the cursor.

As illustrated in FIG. 8, the controller 130 may add the first object 820 to the image 810 and add the second object 830 to the image output from the frame rate converter 113 and output image 850, of which the first and second objects 820 and 830 are added thereto and the frame rate thereof is converted. Each of the first object 820 and the second object 830 are analyzed based on the information for the positions and sizes of the first and second objects 820 and 830. Alternatively, the controller 130 may adjust transparencies of the first and second objects 820 and 830, add the transparency-adjusted first and second objects 820 and 830 to the image output from the frame rate converter 113, and output the image 850 of which the first and second objects are added and the frame rate is converted based on the transparency information of the first and second objects 820 and 830.

In the above described exemplary embodiments, the object may include a GUI.

Figure 9:
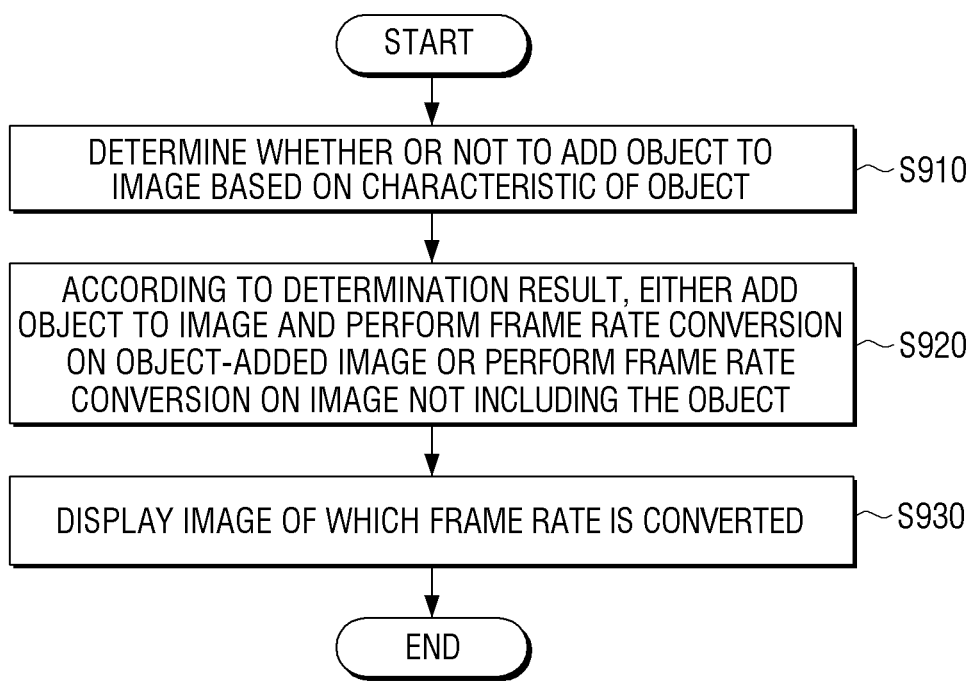
FIG. 9 is a flowchart illustrating a control method of a display apparatus according to an exemplary embodiment.

FIG. 9 is a flowchart illustrating a control method of a display apparatus according to an exemplary embodiment.

According to the control method illustrated in FIG. 9, the display apparatus determines whether or not to add an object to an image based on a characteristic of the object displayed together with the image (S910).

The characteristic of the object may include at least one of data required to display the object, a size of the object, and a movement amount of the object.

According to the determination result, the display apparatus either adds the object to the image and performs frame rate conversion on the object-added image or performs frame rate conversion only on the image not including the object (S920).

The frame rate conversion may include adding the object to the image and performing frame rate conversion on the object-added image in response to a data requirement of the object being equal to or greater than a preset data requirement. Alternatively, the frame rate conversion may include performing frame rate conversion on the image not including the object in response to the data requirement being less than the preset data requirement.

The frame rate conversion may include adding the object to the image and performing frame rate conversion on the object-added image in response to a size of the object being equal to or larger than a preset threshold value and a movement amount of the object being less than a threshold amount. Alternatively, the frame rate conversion may include performing frame rate conversion on the image not including the object in response to the size of the object being less than the preset threshold value and the movement amount of the object equal to or greater than the threshold amount.

The display apparatus may display the image of which the frame rate is converted (S930).

The displaying of the image of which the frame rate is converted may include adding the object to the image of which the frame rate is converted and displaying the object-added image in response to the frame rate conversion not being performed on the object.

The displaying of the image of which the frame rate is converted may include adding the object to the image of which the frame rate is converted based on information for the position and size of the object in the image.

The displaying of the image of which the frame rate is converted may include adjusting transparency of the object based on information for the transparency of the object, and adding the transparency-adjusted object to the image of which the frame rate is converted.

The object may include a plurality of objects, such as a first object and a second object. The performing of the frame rate conversion on the image may include adding the first object to the image and performing frame rate conversion on the first-object-added image in response to a data requirement of the first object being equal to or greater than preset data requirement and a data requirement of the second object being less than the preset data requirement. The displaying of the image of which the frame rate is converted may include adding the second object to the image of which the first object is added and the frame rate thereof is converted, and displaying the second-object-added image.

The object may include a plurality of objects, such as a first object and a second object. The performing of the frame rate conversion on the image may include adding the image to the first object and performing frame rate conversion on the first-object-added image in response to a size of the first object being equal to or larger than a preset threshold value and a movement amount of the first object being less than a threshold amount, and a size of the second object being less than the preset threshold value and a movement amount of the second object being equal to or greater than the threshold amount. The displaying of the image of which the frame rate is converted may include adding the second object to the image of which the first object is added and the frame rate thereof is converted.

The object may include a GUI.

A non-transitory computer-readable medium, in which a program for sequentially performing the control method according to the exemplary embodiment is stored, may be provided.

As an example, a non-transitory computer-readable medium storing a program for performing the operations of determining whether or not to add an object to an image based on a characteristic of the object to be displayed together with the image, adding the object to the image and performing frame rate conversion on the object-added image or performing frame rate conversion on the image not including the object according to a determination result, and displaying the image of which the frame rate is converted, may be provided.

The non-transitory computer-recordable medium is not a medium configured to temporarily store data, but is an apparatus-readable medium configured to semi-permanently store data. Specifically, the above-described applications or programs may be stored in the non-transitory apparatus-readable medium, such as a compact disc (CD), a digital versatile disc (DVD), a hard disc, a Blu-ray disc, a universal serial bus (USB), a memory card, or a read only memory (ROM).

Although buses are not illustrated in the block diagrams illustrating the display apparatus, communication may be performed through buses. A processor, such as a central processing unit (CPU), or a microprocessor configured to perform the above-described various operations, may be further included in the display apparatus.

The foregoing exemplary embodiments and advantages are merely exemplary and are not to be construed as limiting. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display;
an image processor configured to convert an input image signal to a frame rate converted image signal, add an object to the input image signal, and add the object to the frame rate converted signal; and
a controller configured to control the display to display an image based on the frame rate converted image signal, and to control the image processor to add the object to one among the input image signal and the frame rate converted image signal, based on a characteristic of the object,
wherein the controller is further configured to control the image processor to add the object to the input image signal and perform frame rate conversion on the object-added input image signal in response to a data requirement being equal to or greater than a preset requirement, and to add the object to the frame rate converted image signal in response to the data requirement being less than the preset requirement.

2. The display apparatus as claimed in claim 1, wherein the controller is further configured to determine the one among the input image signal and the frame rate converted image signal based on object position information and the size.

3. The display apparatus as claimed in claim 1, wherein the controller is further configured to adjust a transparency of the object and add the transparency-adjusted object to the frame rate converted image signal based on object transparency information.

4. The display apparatus as claimed in claim 1, wherein the object includes a first object and a second object, and
wherein, the controller is further configured to determine, based on first object data requirement relative to a preset requirement, whether to control the image processor to add the first object to the input image signal or the frame rate converted image signal.

5. The display apparatus as claimed in claim 4, wherein the controller is further configured to determine, based on second object data requirement relative to the preset requirement, whether to control the image processor to add the second object to the input image signal or the frame rate converted image signal.

6. A display apparatus comprising:
a display;
an image processor configured to convert an input image signal to a frame rate converted image signal, add an object to the input image signal, and add the object to the frame rate converted signal; and
a controller configured to control the display to display an image based on the frame rate converted image signal, and to control the image processor to add the object to one among the input image signal and the frame rate converted image signal, based on a characteristic of the object,
wherein the controller is further configured to control the image processor to add the object to the input image signal in response to a size being equal to or larger than a preset threshold value and a movement amount being less than a threshold amount, and to add the object to the frame rate converted image signal in response to the size being less than the preset threshold value and the movement amount being equal to or greater than the threshold amount.

7. The display apparatus as claimed in claim 6, wherein the object includes a first object and a second object, and wherein, the controller is further configured to determine, based on at least one of a first object size relative to a preset threshold value and a first object movement amount relative to a threshold amount, whether to control the image processor to add the first object to the input image signal or the frame rate converted image signal.

8. The display apparatus as claimed in claim 7, wherein the controller is further configured to determine, based on at least one of a second object size relative to the preset threshold value and a second object movement amount relative to the threshold amount, whether to control the image processor to add the second object to the input image signal or the frame rate converted image signal.

9. A control method of a display apparatus comprising:
determining whether to add an object to an input image signal or a frame rate converted image signal based on an object characteristic;
adding the object to the determined one among the input image signal and the frame rate converted image signal;
performing frame rate conversion on the input image signal; and
displaying an image based on the frame rate converted image signal,
wherein the performing of the frame rate conversion on the image includes adding the object to the input image signal in response to a data requirement being equal to or greater than a preset requirement, and adding the object to the frame rate converted image signal in response to the data requirement being less than the preset requirement.

10. The control method as claimed in claim 9, wherein the determining is based on object position information and object size.

11. The control method as claimed in claim 9, wherein the displaying of the image includes adjusting a transparency of the object based on object transparency information, and adding the transparency-adjusted object to the frame rate converted image signal.

12. The control method as claimed in claim 9, wherein the object includes a first object and a second object, and
the determining is based on a first object data requirement and a preset requirement.

13. The control method as claimed in claim 12, wherein the determining is based on a second object data requirement and the preset requirement.

14. A control method of a display apparatus comprising:
determining whether to add an object to an input image signal or a frame rate converted image signal based on an object characteristic;
adding the object to the determined one among the input image signal and the frame rate converted image signal;
performing frame rate conversion on the input image signal; and
displaying an image based on the frame rate converted image signal,
wherein the performing of the frame rate conversion on the image includes adding the object to the input image signal in response to the size being equal to or larger than a preset threshold value and a movement amount being less than a threshold amount, and adding the object to the frame rate converted image signal in response to a size being less than a preset threshold value and the movement amount of the object being equal to or greater than the threshold amount.

15. The control method as claimed in claim 14, wherein the object includes a first object and a second object, and the determining includes adding the first object to the input image signal or the frame rate converted image signal based on a first object size relative to a preset threshold value and a first object movement amount relative to a threshold amount.

16. The control method as claimed in claim 15, wherein the determining includes adding the second object to the input image signal or the frame rate converted image signal based on a second object size relative to the preset threshold value and a second object movement amount relative to the threshold amount.

17. An imaging device comprising:
at least one processor configured to:
perform image signal processing on an input image signal, output a frame rate converted image signal, add an object to the input image signal, and the object to the frame rate converted image signal;
determine, in a determination, to add the object to the input image signal in response to an object resource cost being equal to or greater than a threshold resource cost and to add the object to the frame rate converted image signal in response to the object resource cost being less than the threshold resource cost; and
control the image signal processing to add the object to the determined one among the input image signal and the frame rate converted image signal based on the determination,
wherein the object resource cost is determined based on at least one of an object size and an object movement amount.

18. The imaging device as claimed in claim 17, wherein the object comprises a plurality of objects, and
the at least one processor is further configured to determine and control each of the plurality of objects to be added to one among the input image signal and the frame rate converted image signal.

* * * * *